United States Patent [19]

Von Reis et al.

[11] Patent Number: 4,857,376
[45] Date of Patent: Aug. 15, 1989

[54] MOTOR VEHICLE GLASS PANE

[75] Inventors: Wolf Von Reis; Paul Derner; Rudolf Quenett, all of Gelsenkirchen; Guenter Armbruster, Krefeld, all of Fed. Rep. of Germany

[73] Assignee: Flachglas Aktiengesellschaft, Fed. Rep. of Germany

[21] Appl. No.: 98,803

[22] Filed: Sep. 21, 1987

[30] Foreign Application Priority Data

Sep. 24, 1986 [DE] Fed. Rep. of Germany ....... 3632472

[51] Int. Cl.$^4$ ............................ B60J 1/00; E06B 3/62; C03C 27/12
[52] U.S. Cl. ..................................... 428/83; 296/84.1; 428/437
[58] Field of Search .................... 428/83, 437; 52/208; 296/84 R, 84 D, 84 K; 156/108

[56] References Cited

U.S. PATENT DOCUMENTS

| | | | |
|---|---|---|---|
| 2,379,194 | 6/1945 | Shonts et al. | 52/208 |
| 2,572,947 | 10/1951 | Pevney | 52/282 |
| 3,281,296 | 10/1966 | Jameson | 428/83 |
| 3,764,178 | 10/1973 | Krings et al. | 52/208 |
| 4,543,283 | 9/1985 | Curtze et al. | 428/83 |
| 4,707,958 | 11/1987 | Armbruster | 156/108 |

FOREIGN PATENT DOCUMENTS 624573 7/1961 Canada .
1272149 7/1968 Fed. Rep. of Germany .

Primary Examiner—Nancy A. B. Swisher
Attorney, Agent, or Firm—Hill, Van Santen, Steadman & Simpson

[57] ABSTRACT

A motor vehicle glass pane including a sheet of glass and in which in sequence from the side facing the inside of the vehicle in the fitted state includes a plastic-deformable lamination film and an adjoining splinter protection film, and a frame gasket extending around the peripheral edge of the sheet of glass, enclosing its narrow peripheral surfaces as well as an area of the side surfaces close to the peripheral edge on the one hand of the sheet of glass and on the other of the splinter protection film, whereby the lamination film is force-lockingly connected to the frame gasket.

30 Claims, 2 Drawing Sheets

MOTOR VEHICLE GLASS PANE

BACKGROUND OF THE INVENTION

The present invention generally relates to windows and the like for motor vehicles. More specifically, the present invention relates to motor vehicle panes for such windows that include a sheet of glass preferably consisting of a single silicate glass sheet or of a lamination with silicate glass covering sheets, and which include from the side facing the inside of the vehicle when the pane is positioned in the vehicle, a plastic-deformable lamination film made of polyvinylbutyral or similar material and an adjoining splinter protection film made of polyester or similar material. Preferably, these panes are equipped on the inside face with a scratch-resistant coating. A frame gasket made of plastic material, such as polyurethane or similar material, integrally cast, injection moulded, moulded and/or glued on in situ, extends around the peripheral edge of the sheet of glass, which is glued to the splinter protection film by means of the lamination film. The frame gasket encloses the width of the peripheral edge surface as well as an area of the side surfaces close to the peripheral edge on the one hand of the sheet of glass and on the other of the splinter protection film.

When the progressive development of motor vehicles, safety for the occupants, or passengers, of the motor vehicle has, likewise, also improved. One area of improvement in the safety of the vehicle's passengers has included making the motor vehicle's windows safer. Vehicle windows have progressed from simple glass sheet panes originally found in motor vehicles, to the development of thermally toughened glass and more recently, the development of laminated safety glasses. Through these developments and improvements in the glass panes, the risk of injury to the vehicle pasengers from the windows during a collision or accident has been continually reduced.

However, even though thermally toughened glass and laminated glass have reduced the risk of injury to passengers during collisions or accidents, there is still a risk of passengers being cut if the passenger impacts the sheet of glass in the windows, e.g., if the passenger impacts the windshield of the car. For this reason, more recent developments in this area have moved toward building motor vehicle glass panes of various designs, some of which have a coating made of a single or multilayer plastic material on the inner side of the silicate glass sheet or a lamination made of silicate glass sheets, in an attempt to avoid the risk of cuts to the occupants of the vehicle during collisions.

One of these developments has, for example, led to the use of a thin polyester film being applied on the side of the glass sheet that faces the inside of the vehicle, when the glass sheet is positioned in the vehicle, which is joined to the sheet of glass by polyvinylbutyral film. The polyester film is coated with methylsiloxane to make it abrasion-proof. This construction however has numerous disadvantages. The scratch-resistant coated polyester film cannot be firmly attached to the body of the vehicle with conventional fitting devices in motor vehicle glazing. Accordingly, the advantages of the laminated safety glass pane are lost. For example, in the event of the impact of the head of an occupant of the motor vehicle against the glass pane, the lamination materials elastically decelerates the passenger's head so that excessive acceleration of the skull and the associated risk to health are for the most part avoided. However, as a result of the lack of adhesion in the fitting media, the lamination layer frees itself from the body of the vehicle. The passenger is therefore not restrained, but instead forces the motor vehicle's glass pane out of the bodywork because of the force of his acceleration. This results in an increased risk of injury to the passenger.

A motor vehicle glass pane is disclosed in DE-OS No. 35 21 115. The glass pane includes a lamination film and splinter protection film made of polyester, which may have a scratchresistant coating. The films are aligned, in principle, on their peripheral borders with the peripheral border of the sheet of glass. The frame gasket, made of polyurethane, is directly moulded thereon. In this case however, the bond with the frame gasket and the glass pane is produced solely by the adhesion between the polyurethane and the sheet of glass or the splinter protection film. Although this construction prevents glass splinters from being released from the glass sheets during a collision or other accident it does not, however, prevent the glass pane, or the splinter protection film, from being torn out from the frame when impacted by the body of the passenger during a collision. The construction of the glass pane and frame gasket do not allow the forces exerted by the passenger's body to be absorbed. The disclosed motor vehicle glass pane therefore does not function entirely satisfactorily inasmuch as the elastic deformable lamination film cannot elastically decelerate a motor vehicle passenger when the passenger impacts the glass pane during a collision.

DE-OS No. 35 90 207 also discloses a motor vehicle glass pane of the similar type to and with similar disadvantages to those described and discussed above in DE-OS No. 35 21 115.

In order to be able to reliably reduce the impact energy of the motor vehicle passenger during a collision or accident the window pane should act as a safety net to decelerate the passenger during impact. To this end, it is necessary for the plastic coating to be firmly joined to the body of the vehicle along its edges. Conventional polyurethane installation adhesives are compatible with plastic coatings, thus the adhesive sticks to the plastic coating well. In the case of the hard scratch-resistant coating typically used in motor vehicle glass panes neither the material of the frame gasket, during moulding, nor, in the case of gluing, conventional adhesives stick sufficiently well to the polyester film, especially polyester film which is hardened on the surface of the pane.

A method is known from U.S. Pat. No. 2,379,194, with which laminated glasses can be fitted in aircraft in such a way that the compressive forces which occur in the pressurized cabins of aircraft which fly at great heights, can be absorbed. To this end, the plastic film is allowed to protrude beyond the edge of the silicate glass sheets. The overlapping area of the film is used to produce a tight joint in the outer skin of the aircraft. In connection with this, the difficulty of having to produce a sufficiently tight pressed gasket on thick, relatively irregular sheets as a result of the tolerances of the production technique is avoided. Because of the viscoelastic properties of the film, the stress acting vertically on the film is converting into shearing stress in the film with the aid of additional inserts, whereby the property of the film of being highly resistant to shearing action, is exploited. In order to prevent the glass sheet, which is only embedded in the external skin of the aircraft via the thermoplastic intermediate layer, from being pressed outwards out of the aircraft at great heights under the static pressure on the inside of the aircraft, a reinforcing element is inserted in the area of the overlapping film so that in this way fixing of the sheets of glass parallel to the outer skin of the aircraft is ensured.

DE-OS No. 22 47 644 discloses a motor vehicle glass pane in which the glass unit is glued to the frame, which can then surround both the sheet of glass as well as an applied plastic coating. However the problem of a sufficient transmission of the impact energy from the plastic-deformable lamination film to the body of the vehicle in the event of impact is not overcome because the plastic materials adhere poorly with the adhesive or the frame material.

U.S. Pat. No. 2,572,947 shows a laminated glass pane structure, in which a plastic film arranged between two sheets of glass is fitted with projections protruding from the plane of the glass sheet. The projections function to secure the glass unit in the frame. However, for example, when the glass pane is used in aircraft windows, the projections provided therein make a relatively thick glass pane construction necessary. This large thick construction prevents usage of the glass panes in typical motor vehicles of modern design.

There is therefore a need for an improved glass pane for motor vehicles.

SUMMARY OF THE INVENTION

The present invention therefore aims to create a motor vehicle glass pane, in which the bonding of the glasss sheet or of the lamination and/or splinter protection film with the frame gasket is such that not only is the function of the splinter protection coating provided, but also the retention function of the plastic-deformable lamination coating is ensured and an adequate force-locking bond between the plastic-deformable lamination layer and the body of the motor vehicle is guaranteed.

the problems set forth above or prior motor vehicle glass panes is solved, in accordance with the present invention, by force-lockingly connecting the lamination film with the frame gasket. To this end, the glass pane can be constructed so that the force-locking connection between the lamination film and the frame gasket to have a positive locking connection.

The invention also provides for the force-locking connection between the lamination film and the frame gasket to have an adhesive bond.

It can also be provided, in accordance with the present invention, for the force-locking connection between the lamination film and the frame gasket to have a direct contact between the lamination film and the frame gasket.

In an embodiment of the present invention, there is provided a force-locking connection between the lamination film and the frame gasket to be effective via the splinter protectio film and/or the glass pane. In this regard, the lamination film can be stretched in the plane of the glass pane beyond the peripheral boundary of the glass pane.

In an embodiment of the present invention, the lamination film extends in the plane of the glass pane beyond the peripheral border of the splinter protection film. To this end, the peripheral border of the lamination film can essentially be in alignment with the peripheral border of the splinter protection film.

Through the present invention, at least one of the side surfaces of the lamination film is in adhesive contact with the frame gasket.

In an embodiment of the present invention, the edge of the lamination film projects beyond the peripheral border of the glass pane and if necessary the splinter protection film is provided with a form fit element. To this end, it can be arranged for the form fit element to have a number of edge holes. If necessary, tubular rivets or the like can be inserted into the edge holes.

In accordance with the present invention, it can also be arranged for the form fit element to enclose an end area of the lamination film, and if necessary of the splinter protection film, which is bent downwardly from the plane of the film at a certain distance from the peripheral edge of the glass pane.

In an embodiment of the present invention, the form fit element encloses a supporting piece glued to the lamination film at a distance from the peripheral edge of the glass pane.

In an embodiment of the present invention, the form fit element has a U-shaped profile made of a rigid material, such as metal, plastic, or the like, that adjoins with one side piece the peripheral surface of the glass pane, with the other side piece the bent-down end area of the lamination film or the supporting piece, and with its cross piece the area of the lamination film extending beyond the peripheral border of the glass pane, parallel to its plane.

In an embodiment, the lamination film can be drawn around the peripheral surface of the glass pane at least until it is aligned with the side surface of the glass pane facing away from the splinter protection film and is glued to the glass pane.

The lamination film can also be folded back over the peripheal surface of the glass pane and glued to itself.

In an embodiment of the present invention, the lamination film is folded around the insert. In this regard, the insert can be glued to the peripheral surface of the glass pane.

In addition, it can also be provided, in accordance with the present invention, for a positive locking connection to be created as a result of the folding back of the lamination film producing a thickening of the edge.

In an embodiment of the present invention, the peripheral border of the lamination film is basically in alignment with that of the glass pane or lies within the latter. The splinter protection film is constructed so that it ends at a distance within the peripheral border of the lamination film. The splinter protection film is in adhesive contact with the frame gasket.

The present invention is based upon the astonishing findings that the problems posed in the prior art can be solved by at least the plastic-deformable lamination coating or lamination film being force-lockingly connected with the mouldedon frame. For this purpose, the lamination film can, for example, protrude beyond the edge of the silicate glass pane in the manner disclosed. The force-locking connection can be achieved by a positive locking connection, adhesion, or a combination of the two. In principle, it is also conceivable that the force-locking connection is achieved by reducing the non-adhesive splinter protection film in such a way that the lamination film is free at the edges. In any event, it is ensured that in the event of a collision if, for example, the passenger's head impacts the glass pane, a considerable amount of the impact energy is absorbed and diverted or dissipated by means of the plastic-deformable lamination film that is firmly joined to the body of the vehicle by means of the frame gasket.

Additional advantages and features of the present invention are described in, and will be apparent from, the detailed description of the presently preferred embodiments and the drawings.

DETAILED DESCRIPTION OF THE PRESENTLY PREFERRED EMBODIMENTS

Although there are many embodiments of the motor vehicle glass pane of the present invention, all the embodiments include a sheet of glass 10. The sheet of glass 10 can consist of a single silicate glass sheet or a laminated safety glass sheet with silicate glass covering sheets. A lamination film 12 made of polyvinylbutyral is glued to the sheet of glass 10. A polyester film 14 is glued to the lamination film 12. Preferably, the side of the polyester film 14 facing away from the lamination film 12 has a scratch-resistant coating. A frame gasket 16, moulded-on in situ and made of polyurethane, encloses the edge of the glass light in a force-lockingly manner.

Figure 1:
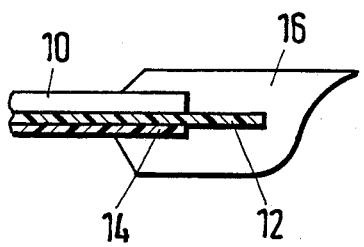
FIG. 1 illustrates a cross-sectional view of the edge area of a motor vehicle glass pane utilizing an embodiment of the present invention.

Referring now to FIG. 1, an embodiment of the present invention is illustrated. As illustrated, the lamination film 12 projects beyond the ege of the sheet of glass 10 by a width of at least 2 cm. In the specific embodiment illustrated in Figure 1, the lamination film 12 projects beyond the sheet of glass 10 by approximately 2.8 cm. A directly moulded-on frame, in the form of the frame gasket 16 made of polyurethane, surrounds the edge both of the sheet of glass 10 as well as the lamination film 12 and the splinter protection film 14. It should be noted that although in an embodiment, the frame gasket 16 is constructed from polyurethane, the frame gasket can be constructed of PVC or other thermoplastic material.

The outer shape of the frame gasket 16 can be adapted to the specific design requirements and installation requirements for the relevant vehicle. Because of the projection of the lamination film 12 beyond the peripheral border of the sheet of glass 10, a relatively wide frame gasket 16 is necessary. In the embodiment illustrated, the frame gasket 16 has a width that is approximately 2.5 to about 3 cm wider than the width of the glass. A force-locking connection is ensured because both side surfaces of the edge of the lamination film 12 projecting beyond the peripheral edge of the sheet of glass 10 and the splinter protection film 12 are in adhesive contact with the material of the frame gasket 16.

Figure 2:
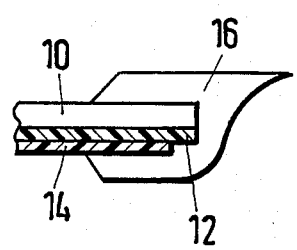
FIG. 2 illustrates a cross-sectional view of another embodiment of the motor vehicle glass pane of the present invention.

Referring now to FIG. 2, another embodiment of the glass pane of the present invention is illustrated. As illustrated, in this embodiment, the peripheral border of the lamination film 12 is basically flush with that of the sheet of glass 10. However, the splinter protection film 14 is set back from the sheet of glass 10 and lamination film 12. In this embodiment, an improved force-locking connection effect is achieved by the direct contact between the material of the frame gasket 16 and the free edge area of the lamination film 12 produced by providing the splinter protection film 14 with a smaller area. The lamination film 12 does not project beyond the outer peripheral contour of the sheet of glass 10, so that the frame gasket 16 can enclose the sheet of glass 10 considerably more tightly than in the case of the embodiment illustrated in FIG. 1. The adhesion between the lamination film 12 and the frame gasket 16, however, it not as strong, in this embodiment, as in the embodiment illustrated in FIG. 1, as a result of the smaller adhesion contact surface. Moreover, there is an additional problem that the splinter projection film 14 must be cut to size very accurately with respect to its outline before being applied onto the sheet of glass 10 having the lamination film 12.

Figure 3:
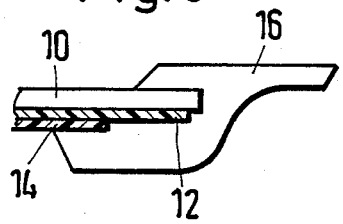
FIG. 3 illustrates a cross-sectional view of another embodiment of the motor vehicle glass pane of the present invention.

Referring now to FIG. 3, another embodiment of the glass pane is illustrated. This embodiment is similar to that illustrated in FIG. 2. However, in this embodiment, a larger contact surface between the material of the frame gasket 16 and the lamination film 12 is created by further setting back the peripheral border of the splinter protection film 14. The lamination film 12 is, in this embodiment, also set back a little compared with the peripheral outline of the sheet of glass 10, in order to be able to avoid, for the most part, any problems in cutting it to proper size.

Figure 4:
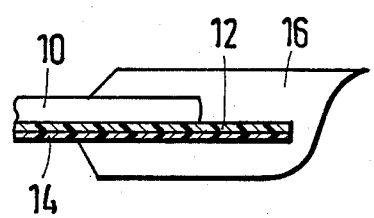
FIG. 4 illustrates a cross-sectional view of another embodiment of the motor vehicle glass pane of the present invention.

In the embodiment of the present invention illustrated in FIG. 4, both the lamination film 12 and the splinter protection film 14 protrude beyond the peripheral outline of the sheet of glass 10, with a similar, or not quite so favorable effect with regard to the shaped closure as in the example of the embodiment illustrated in FIG. 1. Cutting to size is, however, in this case, easier than in the embodiment illustrated in FIG. 3.

Figure 5:
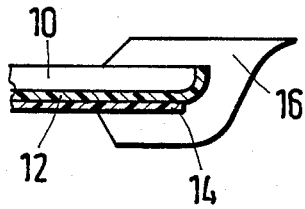
FIG. 5 illustrates a cross-sectional view of another embodiment of the motor vehicle glass pane of the present invention.

Referring now to FIG. 5, another embodiment of the glass pane is illustrated. As illustrated, in this embodiment, the splinter protection film 14, in principle, has the same dimensions as the sheet of glass 10, while as a variation from the example of embodiment illustrated in FIG. 1, the lamination film 12 is wrapped around the edge of the sheet of glass 10. In terms of production techniques, this has the advantage that the lamination film 12 does not have to protude widely over the edge of the sheet of glass 10, but that the sheet unit as previously in the lamination process can be handled. The frame gasket 16, which functions to produce the force-locking connection with the body of the vehicle, is, in this case, moulded-on in a similar way as in the embodiment illustrated in FIG. 1. However, in the embodiment illustrated in FIG. 5, the frame gasket 10 can be much narrower. An overlap by the lamination film 12 to a width of approximately 5 to 10 mm around the peripheral edge of the sheet of glass 10 is sufficient. The outer shape can in this case also be adapted, for the most part, to the vehicle's fitting or design requirements.

Figure 6:
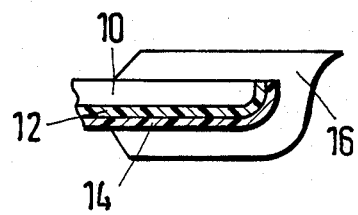
FIG. 6 illustrates a cross-sectional view of another embodiment of the motor vehicle glass pane of the present invention.

Referring now to FIG. 6, another embodiment of the present invention is illustrated. The embodiment illustrated in FIG. 6 differs from the embodiment illustrated in FIG. 5 in that not only the lamination film 12, but also the splinter protection film 14, is wrapped around the edge of the sheet of glass 10. The lamination film 12 only adheres to the sheet of glass 10, which for its part is in force-locking adhesive contact with the frame gasket 16. A positive locking connection is in this case not provided. From a production technique standpoint, this embodiment has, in spite of the more limited effect of the force-locking connection, an advantage compared with the embodiment illustrated in FIG. 5, in that there is no sticky overlap, namely of the lamination film 12, around the sheet of glass 10.

Figure 7:
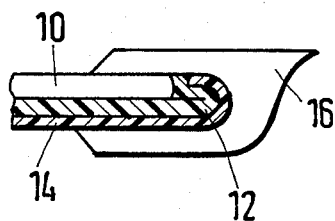
FIG. 7 illustrates a cross-sectional view of another embodiment of the motor vehicle glass pane of the present invention.

Referring now to FIG. 7, another embodiment of the present invention is illustrated. In this embodiment, the lamination film 12 is folded back and is glued to itself. By wrapping the lamination film 12 around and gluing it to itself, against the edge of the sheet of glass 10, the possibility of the lamination film 12 being ripped out from the lamination is made considerably more difficult. A highly elastic-deformable clamping effect is produced which supports the "safety net effect" of the lamination film 12. This thereby provides a considerable improvement in the motor vehicle glass pane with respect to head acceleration in the event of impact (the HIC-value). This provides a particularly important characteristic of the invention which provides a motor vehicle glass pane with improved impact behavior. From a production technique standpoint, this embodiment is particularly convenient.

Figure 8:
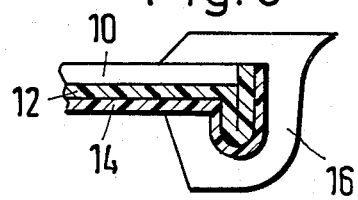
FIG. 8 illustrates a cross-sectional view of another embodiment of the motor vehicle glass pane of the present invention.

FIG. 8 illustrates another embodiment of the present invention. The embodiment illustrated in FIG. 8 differs from the embodiment illustrated in FIG. 7 by the fact that as illustrated, the edges are thickened. The edge thickening provides an additional positive locking connection with the frame gasket 16. A disadvantage in connection with this embodiment is however that the thickness of the frame gasket 16 is large. It is necessary for the frame gasket to have an overall thickness of approximately 17 to about 20 mm.

Figure 9:
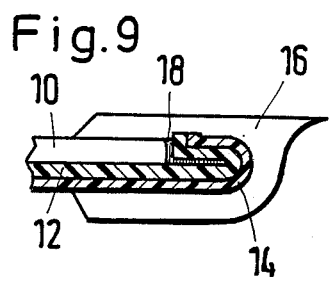
FIG. 9 illustrates a cross-sectional view of another embodiment of the motor vehicle glass pane of the present invention.

Referring now to FIG. 9, a further embodiment of the present invention that improves upon the embodiment of FIG. 7 is illustrated. This embodiment improves upon the embodiment of FIG. 7 in that the clamping effect of the lamination film 12, that is glued to itself, is considerably increased by the laying of an insert 18 in between the folded lamination layer. 12. The positioning insert 18 prevents the lamination film 12 from slipping because the lamination layer 12 is wrapped around the insert 18 so that a strong clamping effect is ensured.

Figure 10:
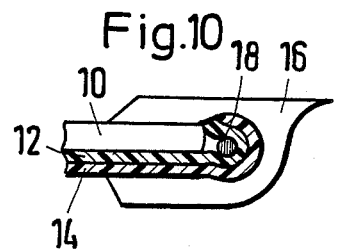
FIG. 10 illustrates a cross-sectional view of another embodiment of the motor vehicle glass pane of the present invention.

Referring now to FIG. 10, in the embodiment illustrated, a positive locking connection by the embodiment illustrated in FIG. 9. A positive locking connection is provided by use of appropriate edge thickening, as in the embodiment illustrated in FIG. 8.

Figure 11:
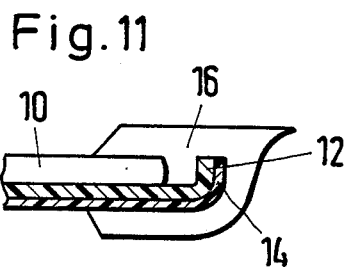
FIG. 11 illustrates a cross-sectional view of another embodiment of the motor vehicle glass pane of the present invention.

FIG. 11 illustrates another embodiment of the present invention. As illustrated in the embodiment of FIG. 11, the lamination film 12 and the splinter protection film 14 are bent downwardly from the sheet of glass 10 at a certain distance from the peripheral edge of the sheet of glass 10. This construction results in an effective positive locking connection with the frame gasket 16.

Figure 12:
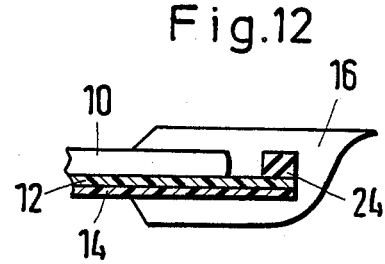
FIG. 12 illustrates a cross-sectional view of another embodiment of the motor vehicle glass pane of the present invention.

Referring now to FIG. 12, a further embodiment of the present invention is illustrated in which in a similar manner to the embodiment illustrated in FIG. 11 a positive locking connection is ensured between the lamination film 12 and the splinter protection film 14 on the one hand and the sheet of glass 10 on the other hand. However, the positive locking connection is not created by bending down the end areas of the lamination film 12 and/or the splinter protection film 14 from the plane of glass pane at a certain distance from the peripheral edge of the sheet of glass 10, as in the case of the embodiment illustrated in FIG. 11, but by the utilization of a supporting piece 24 that is glued onto the lamination film 12 at a certain distance from the peripheral edge of the sheet of glass 10. The clamping effect is in this case produced by the adhesion of the lamination film 12 with the contact piece 24, that produces a positive locking connection.

Figure 13:
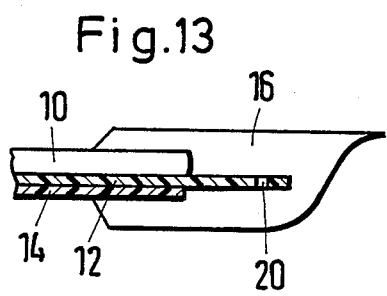
FIG. 13 illustrates a cross-sectional view of another embodiment of the motor vehicle glass pane of the present invention.

Referring now to FIG. 13, an embodiment of the present invention is illustrated that represents a modification of the example of the embodiment illustrated in FIG. 1. In the embodiment illustrated in FIG. 13, edge holes 20 are stamped into the overlapping edge of the lamination film 12, in the area of the overlap, at regular intervals. Accordingly, when the frame gasket 16 is moulded-on to the glass pane, a positive locking connection is created with the lamination film 12 and frame gasket 16 in the overlap area so that the lamination film 12 is firmly secured in the frame gasket 16. To achieve this construction, a slightly wider frame gasket 16 is again required, as in the embodiment illustrated in FIG. 1.

Figure 14:
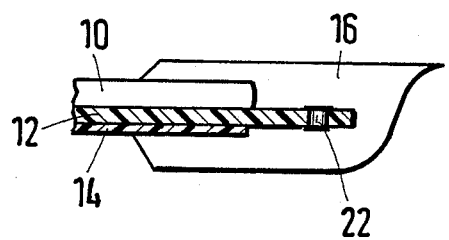
FIG. 14 illustrates a cross-sectional view of another embodiment of the motor vehicle glass pane of the present invention.

Referring now to FIG. 14, another embodiment of the present invention is illustrated. The embodiment illustrated in FIG. 14 differs from that illustrated in FIG. 13 by the fact that tubular rivets 22 are inserted into the edge holes. This reduces the notch effect of the shaped closure when compared with the embodiment illustrated in FIG. 13. The result is the achievement of higher strength in the event of stressing of the lamination film 12. In both of the embodiments illustrated in FIGS. 13 and 14, not only the lamination film 12, but also the splinter protection film 14, can project for an appropriate width over the peripheral edge of the glass sheet 10, as in the embodiment illustrated in FIG. 4. This results in the edge holes 20 being passed through both the lamination film 12 as well as the splinter protection film 14 joined to the lamination film 12. This construction achieves a particularly good clamping effect as the splinter protection film 14 is also joined to the frame gasket 16 by a force-locking and a positive locking connection.

Figure 15:
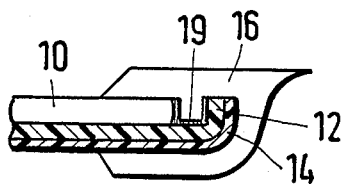
FIG. 15 ilustrates a cross-sectional view of another embodiment of the motor vehicle glass pane of the present invention.

FIG. 14 illustrates another embodiment of the present invention. In the embodiment illustrated in FIG. 15, a modification of the embodiment illustrated in FIG. 11 is provided. As illustrated, a U-shaped profile 19, made of hard plastic, is inserted between the sheet of glass 10 and the end area of the lamination film 12 and the splinter protection film 14. To this end, both the lamination film 12 and the splinter protection film 14 are bent downwardly out of the plane of the glass light pane, with one side of the U-shaped profile 19 adjoining the peripheral area of the sheet of glass 10, with its other side adjoining the bent down end area of the lamination film 12 and the cross piece of which lies on a flat area of the lamination film 12. The U-shaped profile 19 is used both as a reinforcing element, as well as a spacer and form fit element. It should be noted that the U-shaped profile 19 can also be used in the embodiments illustrated in FIGS. 9 and 12.

In all of the embodiments illustrated in FIGS. 1-15, as generally when applying the idea of the present invention, at least one of the sheets of silicate glass can be replaced by a plastic sheet, made of, for example, polycarbonate or PMMA. When using such a plastic sheet, however, the tendency of the pane to splinter and the risk of injury to the occupants of the vehicle are not as high as when using a sheet of silicate glass. Instead of polyvinylbutyral as a lamination film material, polyurethane can, for example, also be used. It is also conceivable to use the force-locking connection of the lamination film with the frame gasket only over certain sections, for example, only along the side edges or the top and/or lower edges of the motor vehicle glass panes.

It should be understood that various changes and modifications to the presently preferred embodiments described herein will be apparent to those skilled in the art. Such changes and modifications can be made without departing from the spirit and scope of the present invention and without diminishing its attendent advantages. It is therefore intended that such changes and modifications be covered by the appended claims.

We claim:

1. A motor vehicle glass pane including a sheet of glass, a plastic deformable lamination film, a splinter protection film, and a frame gasket, the plastic deformable lamination film being secured to the sheet of glass and the splinter protection film being secured to the lamination film, the frame gasket consisting of a plastic material extending around a peripheral edge of the sheet of glass enclosing a width of the peripheral edge as well as a portion of the peripheral side of the sheet of glass and the splinter protection film, the lamination film is connected in a forced locking manner to the frame gasket by a direct adhesive connection between at least one of the side surfaces of the lamination film and the frame gasket.

2. The motor vehicle glass pane of claim 1 wherein a peripheral side of the lamination film extends beyond the peripheral border of the sheet of glass.

3. The motor vehicle glass pane of claim 2 wherein the peripheral side of the lamination film extends beyond a peripheral border of the splinter protection film.

4. The motor vehicle glass pane of claim 2 wherein the peripheal side of the lamination film is approximately flush with a peripheral border of the splinter protection film.

5. The motor vehicle glass pane of claim 2 wherein the lamination film includes side surfaces and at least one of the side surfaces of lamination film is in adhesive contact with the frame gasket.

6. The motor vehicle glass pane of claim 3 wherein the lamination film includes side surfaces and at least one of the side surfaces of lamination film is in adhesive contact with the frame gasket.

7. The motor vehicle glass pane of claim 4 wherein the lamination film includes side surfaces and at least one of the side surfaces of lamination film is in adhesive contact with the frame gasket.

8. The motor vehicle glass pane of claim 2 wherein the peripheral edge of the lamination film that extends beyond the peripheral border of the sheet of glass includes means for securing the lamination film to the gasket.

9. The motor vehicle glass pane of claim 8 wherein the means for securing includes at least one edge hole in the lamination film.

10. The motor vehicle glass pane of claim 9 wherein the means for securing includes tubular rivets that are inserted into the edge holes.

11. The motor vehicle glass pane of claim 8 wherein the means for securing is located in a peripheral end area of the lamination film that is bent downwardly from the film plane at a distance from the peripheral edge of the sheet of glass.

12. The motor vehicle glass pane of claim 11 wherein the means for securing includes a U-shaped profile made of a rigid material that has a leg located in juxtaposition to a peripheral area of the sheet of glass with a second leg being located in juxtaposition to a peripheral edge of the bent downwardly portion of the lamination film.

13. The motor vehicle glass pane of claim 8 wherein the means for securing includes a supporting piece glued to the lamination film at a distance from the peripheral edge of the sheet of glass.

14. The motor vehicle glass pane of claim 1 wherein a peripheral edge of the lamination film is approximately flush with a peripheral edge of the sheet of glass and the splinter protection film peripheral edge ends at a distance within a peripheral border of the lamination film; and the lamination film is in adhesive contact with the frame gasket.

15. A motor vehicle glass pane including a sheet of glass, a plastic deformable lamination film, a splinter protection film, and a frame gasket, the plastic deformable lamination film being secured to the sheet of glass and the splinter protection film being secured to the lamination film, the frame gasket extending around a peripheral edge of the sheet of glass enclosing a width of the peripheral edge as well as a portion of the peripheral side of the sheet of glass and the splinter protection film, the frame gasket being connected to the lamination film in a forced locking manner, and the lamination film is bent around and glued to a peripheral area of the sheet of glass.

16. The motor vehicle glass pane of 15 wherein the lamination film is glued to a portion of itself.

17. The motor vehicle glass pane of claim 15 wherein the lamination film is bent around an insert.

18. The motor vehicle glasss pane of claim 16 wherein the lamination film is bent around an insert.

19. The motor vehicle glass pane of claim 16 wherein a peripheral edge of the folded portion of the lamination film creates an edge thickening producing a positive locking connection with the frame gasket.

20. The motor vehicle glass pane of claim 17 wherein the insert is glued to a peripheral area of the sheet of glass.

21. The motor vehicle glass pane of claim 17 wherein a peripheral edge of the folded portion of the lamination film creates an edge thickening producing a positive locking connection with the frame gasket.

22. A motor vehicle glass pane including a sheet of glass, a plastic deformable lamination film, a splinter protection film, and a frame gasket, constructed from a plastic material, circumscribing a peripheral edge of the sheet of glass, the pane including means for creating a forced locking connection connecting the plastic lamination to the frame gasket, a portion of the lamination film being secured to the frame gasket by a direct adhesive connection between at least one side of the side surfaces of the lamination film and the frame gasket.

23. The glass pane of claim 22 wherein the means includes an outer peripheral edge of the lamination film that extends beyond a peripheral edge of the sheet of glass.

24. The glass pane of claim 22 wherein the means includes a folded peripheral edge of the lamination film that is folded over onto a portion of the lamination film.

25. The glass pane of claim 22 wherein the means includes a thickened cross-sectional width of the sheet of glass, lamination film, and splinter film at a peripheral edge thereof.

26. The glass pane of claim 23 wherein the means includes a peripheral edge of the lamination film bent downwardly in a direction out of a plane of the sheet of glass.

27. The glass pane of claim 26 wherein the means includes a U-shaped member inserted in a space between the sheet of glass and bent peripheral edge.

28. The glass pane of claim 23 wherein the means includes at least one edge hole in the peripheral edge.

29. The glass pane of claim 23 wherein the splinter protection film includes an outer peripheral edge extending beyond the peripheral edge of the sheet of glass.

30. A motor vehicle glass pane including a sheet of glass, a plastic deformable lamination film, a splinter protection film, and a frame gasket, the plastic deformable lamination film being secured to the sheet of glass and the splinter protection film being secured to the lamination film, the frame gasket consisting of plastic material extending around a peripheral edge of the sheet of glass enclosing a width of the peripheral edge as well as a portion of the peripheral side of the sheet of glass and the splinter protection film, and including a positive locking connection between the lamination film and the frame gasket.

* * * * *